March 24, 1936.  G. S. CLEGHORN  2,035,221
PIPE OR LIKE JOINTS
Filed Jan. 23, 1935  2 Sheets-Sheet 1

INVENTOR
GEORGE SHEWAN CLEGHORN
BY Haseltine, Lake & Co.
ATTORNEYS

March 24, 1936.                G. S. CLEGHORN                2,035,221
                              PIPE OR LIKE JOINTS
                         Filed Jan. 23, 1935      2 Sheets-Sheet 2
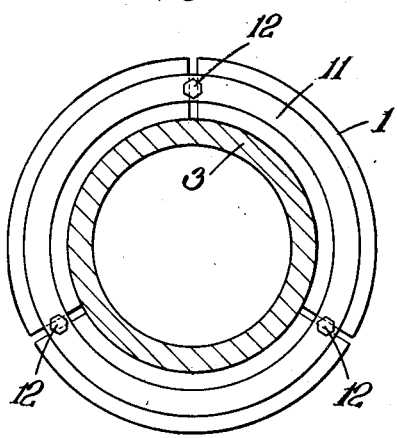
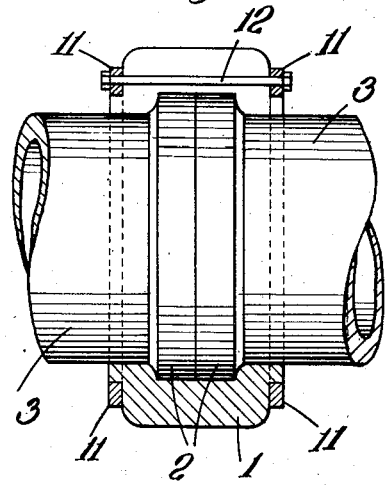
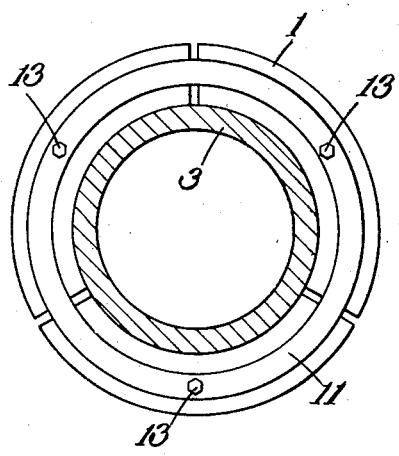
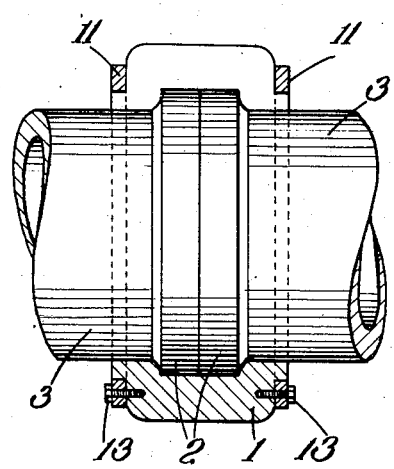
INVENTOR
GEORGE SHEWAN CLEGHORN
BY Haseltine, Lake & Co.
ATTORNEYS Patented Mar. 24, 1936

2,035,221

UNITED STATES PATENT OFFICE 2,035,221

PIPE OR LIKE JOINTS

George Shewan Cleghorn, Sheffield, England, assignor to English Steel Corporation Limited, Sheffield, England, a British company Application January 23, 1935, Serial No. 2,991
In Great Britain April 28, 1934

7 Claims. (Cl. 285—129)

This invention relates to joints for pipes or vessels of the kind wherein the two members to be joined are held together by means of arcuate shaped clamps engaging projections or flanges on the members. The chief object of the invention is to provide improved means for retaining the clamps in position.

According to the invention, the clamps are retained in position on their co-operating flanges or projections by means of rings located at opposite ends of the clamps and adapted to engage projections formed on the end faces of the clamps.

Ordinary plain bored rings may be employed, the rings being maintained in position by means of bolts or their equivalents engaging the clamps, or alternatively, each ring may be provided with a number of inwardly directed projections adapted to lie behind and co-operate with corresponding radially projecting lips or shoulders provided upon the projections on the clamps, the rings being adapted to be removed by first turning them axially into a position in which their inwardly directed projections are free of the lips or shoulders and then withdrawing the rings from the projections by an endwise movement. With the latter arrangement, bolts or some other kind of safety device may be provided for preventing accidental rotational movement of the rings taking place.

In order that the invention may be clearly understood and readily carried into effect, the same will now be more fully described with reference to the accompanying drawings illustrating a number of embodiments of the invention wherein:—

Figure 6 is an end elevation of a further modified construction.

Figure 7 is a vertical section of the joint illustrated in Figure 6.

Figure 8 is an end elevation of a still further modified form.

Figure 9 is a vertical section of the joint illustrated in Figure 8.

Figure 1:
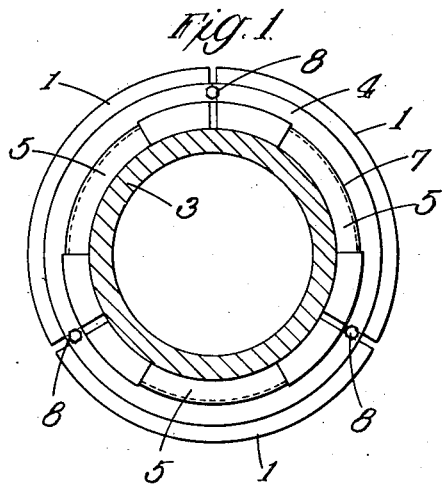
Figure 1 is an end elevation of a pipe or like joint showing one exemplification of the invention applied thereto.

In the constructions shown by Figures 1 to 5 the arcuate shaped clamps 1 which surround flanges 2 on the pipes 3 are maintained in position by means of rings 4 which surround laterally arranged projections 5 provided upon the clamps. As illustrated, three clamps are provided, but any desired number may be employed, each clamp incorporating a projection 5 situated approximately midway of the length of the clamp and of a length substantially equal to half the length of the said clamp.

In order to maintain the rings in their operative positions, each ring is provided with a number of inwardly directed projections 6 spaced around its inner periphery and adapted, when the ring is in its operative position, to lie behind upstanding lips or shoulders 7 on its associated projections 5, each projection 6 being of a length substantially equal to the length of the lip or shoulder 7 and of a slightly less length than the distance separating the shoulders to enable the ring to be readily removed by turning the ring axially until the projections 6 are clear of the parts 7, the ring being then removed by an endwise sliding movement.

Figure 2:
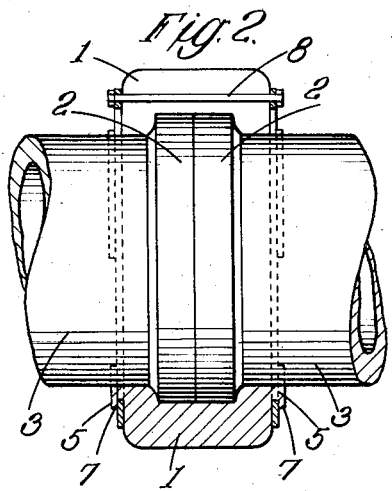
Figure 2 is a vertical section of the same.
Figure 3:
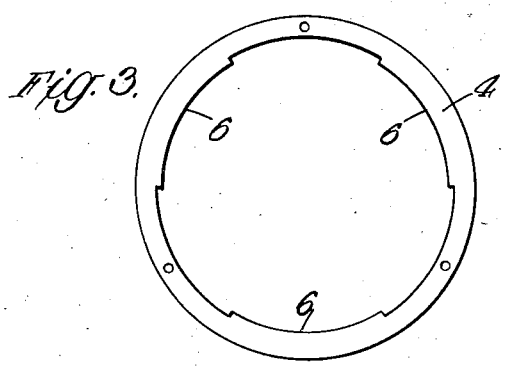
Figure 3 is a plan of one of the retaining rings detached.

In order to prevent the rings turning accidentally during use, it is preferred that some sort of safety locking device shall be provided, and in Figures 1 and 2, this device includes bolts 8 which are passed through the rings and through the spaces normally provided between the clamps. Alternatively, the bolts may pass through holes bored in the clamps or, as a further alternative, set screws or like members may be used.

Figure 4:
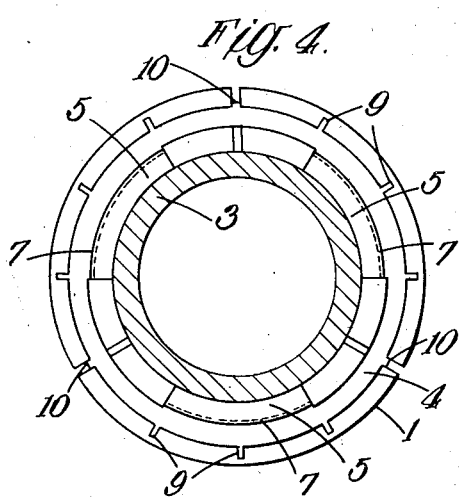
Figure 4 is an end elevation showing a modified construction.
Figure 5:
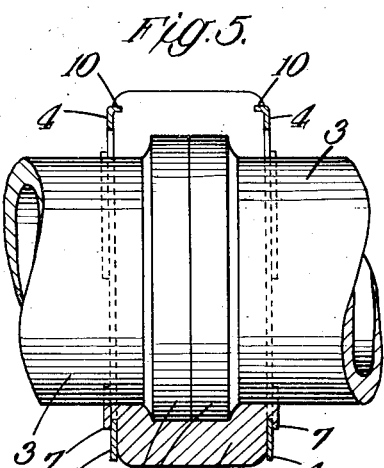
Figure 5 is a vertical section of the joint illustrated in Figure 4.

In the modified construction shown by Figures 4 and 5, each ring is provided with a number of radially projecting tangs 9 some of which may be bent as shown at 10 into a position in which they enter the spaces between the clamps so as to prevent rotation of the rings when in their operative position.

In the construction shown by Figures 6 and 7 ordinary plain bored rings 11 are employed and in this construction the projections 5 on the arcuate clamps are not provided with a lip or shoulder, holes being provided in each ring opposite the spaces between the clamps, through which holes retaining bolts 12 are passed so as to retain the rings in their operative position.

In the arrangement shown by Figures 8 and 9, the rings 11 are similar to those shown in Figures 6 and 7 but in this construction screws 13 or their equivalents are employed in lieu of the bolts, which screws enter holes provided in the clamps themselves.

What I claim and desire to secure by Letters Patent of the United States is:—

1. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections and means for locking said rings positively in position on said projections.

2. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections and means for locking said rings positively in position on said projections, said means comprising screw threaded members passing through said rings and engaging said clamps.

3. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections, radially projecting lips on said projections co-operating with inwardly directed projections on said rings and means for locking said rings positively in their operative position on said projections.

4. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections, radially projecting lips on said projections co-operating with inwardly directed projections on said rings and means for locking said rings positively in their operative position on said projections, said means comprising screw threaded members passing through said rings and engaging said clamps.

5. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections, radially projecting lips on said projections co-operating with inwardly directed projections on said rings and means for locking said rings positively in their operative position on said projections, said means comprising bolts passing through said rings and through spaces formed between adjacent clamps.

6. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections, radially projecting lips on said projections co-operating with inwardly directed projections on said rings said projections on said clamps and on said rings being of arcuate shape, said rings being removable from said projections by turning said rings into a position in which they are clear of said radially projecting lips, and means for locking said rings positively in their operative position on said projections when desired.

7. A pipe joint comprising arcuate shaped clamps surrounding the members to be joined at their junction and engaging laterally directed end flanges on said members, projections formed on the end faces of said clamps, means for retaining said clamps in their operative position comprising rings surrounding and engaging said projections, radially projecting lips on said projections engaging inwardly directed projections on said rings and means for locking said rings positively in position on said projections, said means comprising tangs formed on said rings and bendable into a position in which they enter spaces formed between said clamps.

GEORGE SHEWAN CLEGHORN.